United States Patent [19]

Schwarz

[11] 4,067,460

[45] Jan. 10, 1978

[54] ARRANGEMENT FOR IMPROVING TRANSLOADING POURABLE MATERIALS BY MEANS OF A GRAB BUCKET

[75] Inventor: Wilhelm Schwarz, Wilhelmshaven, Germany

[73] Assignee: Fried. Krupp Gesellschaft mit beschrankter Haftung, Essen, Germany

[21] Appl. No.: 562,233

[22] Filed: Mar. 26, 1975

[30] Foreign Application Priority Data

Apr. 5, 1974 Germany ............................ 2416644

[51] Int. Cl.$^2$ ........................ A01F 25/00; B66C 17/00

[52] U.S. Cl. .................................. 214/17 B; 294/131; 212/18; 212/125; 212/127

[58] Field of Search ............................... 212/1, 10–14, 212/18, 77–78, 79–82, 83–84, 97–98, 124–129, 130; 214/17 R, 17 A, 17 B, 17 D, 16 R, 15 C; 209/134, 136, 138, 147; 294/131–132

[56] References Cited

U.S. PATENT DOCUMENTS

| | | | |
|---|---|---|---|
| 717,162 | 12/1902 | Campbell | 212/81 |
| 869,929 | 11/1907 | McClellon | 212/81 |
| 1,057,735 | 4/1913 | Hertz | 212/129 |
| 3,405,820 | 10/1968 | Mori | 214/17 B |
| 3,870,168 | 3/1975 | Aralf | 214/17 b |
| 3,883,011 | 5/1975 | Pennell | 214/17 B |

*Primary Examiner*—Robert J. Spar
*Assistant Examiner*—R. B. Johnson
*Attorney, Agent, or Firm*—Walter Becker

[57] ABSTRACT

An arrangement for improving transloading pourable materials by means of a grab bucket, according to which a hood is carried by a crane member on which a grab bucket is suspended by hoisting means. The arrangement is such that the grab bucket can be pulled selectively from below into the hood which is so dimensioned as to allow the grab bucket substantially fully to open within the hood. The lower rim of the hood which surrounds the inlet opening for the grab bucket and the upper rim of a chute-like member through which the goods to be transloaded are from the grab bucket passed into a receiver, are flange-shaped and of at least nearly equal circumferential dimensions. If desired, an elastic member, e.g. a sealing ring or an inflatable hose may rest on and be connected to the flange-shaped rim of the chute-like member.

3 Claims, 11 Drawing Figures

FIG. 8
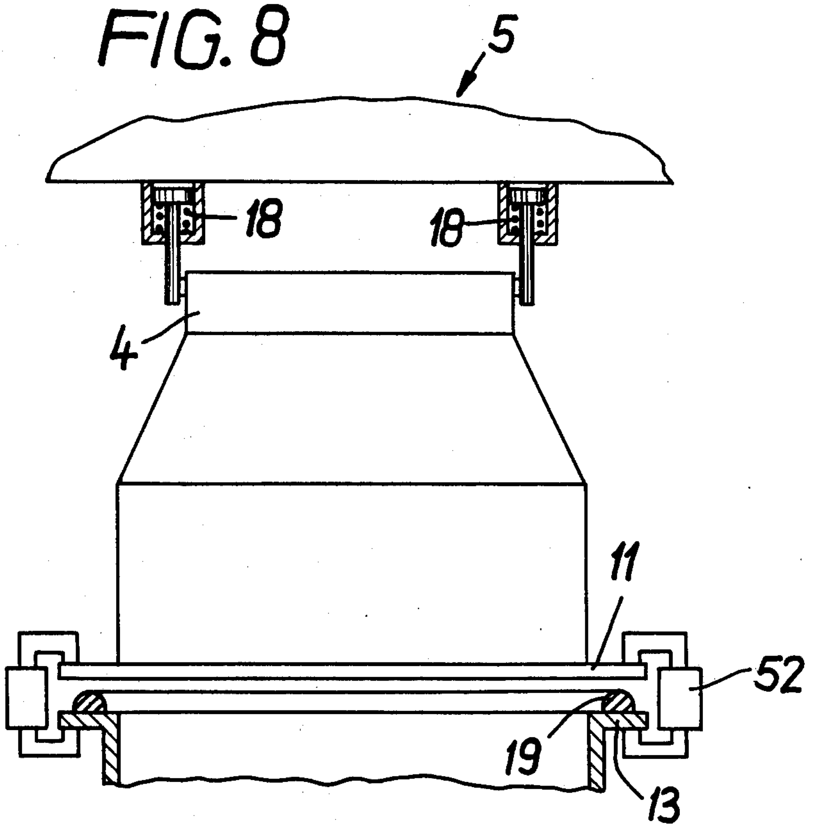
FIG. 9
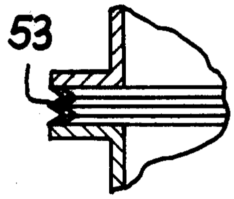
FIG. 10
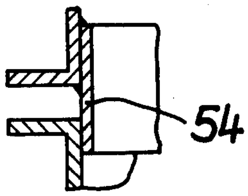
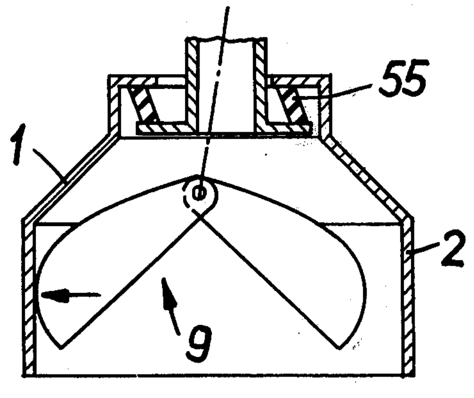
FIG. 11

ARRANGEMENT FOR IMPROVING TRANSLOADING POURABLE MATERIALS BY MEANS OF A GRAB BUCKET

When transloading pourable goods by means of a grab or grab bucket, the emptying of the grab bucket is, depending on the moisture content of the material, causing more or less strong dust development. This is the case, for instance, with ship unloaders which, for example, pour ores, or fish meal by grap buckets into bunkers fixedly arranged on said ship unloaders. In order to prevent the settling of such dust on the surroundings, a closeable chamber has been built onto a bunker provided for receiving the pourable material into which chamber a grab bucket to be emptied is moved by the movements of a crane trolley supporting said grab bucket. This solution to the problem involved requires considerable expenses for the construction of closeable chambers.

It is, therefore, an object of the present invention to considerably reduce the expenses for avoiding the dust development when transloading pourable materials by means of grab buckets.

These and other objects and advantages of the invention will appear more clearly from the following specifications, in connection with the accompanying drawings, in which.

Figure 4:
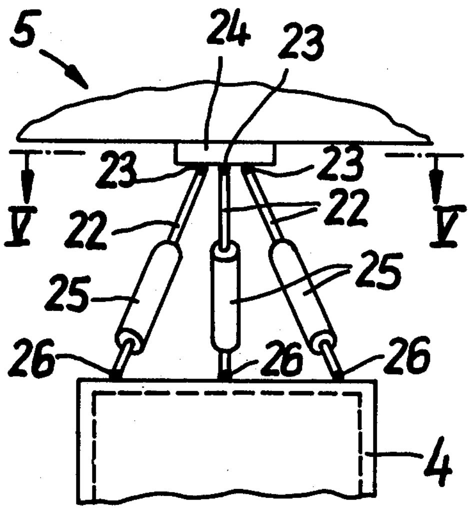
FIG. 4 shows a suspension means for a hood in side view, according to a further embodiment of the invention.
Figure 6:
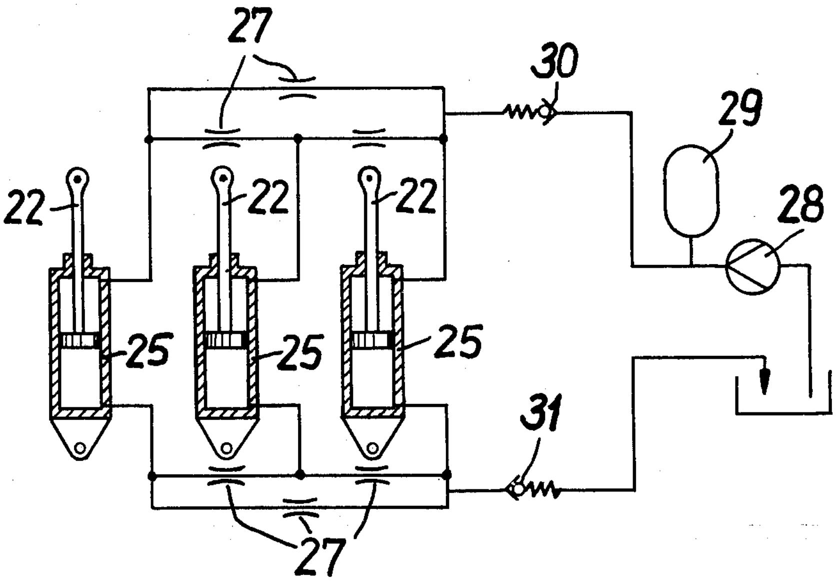

FIG. 6 diagrammatically illustrates the same suspension as in FIG. 4 with a hydraulic circuit.

Figure 7:
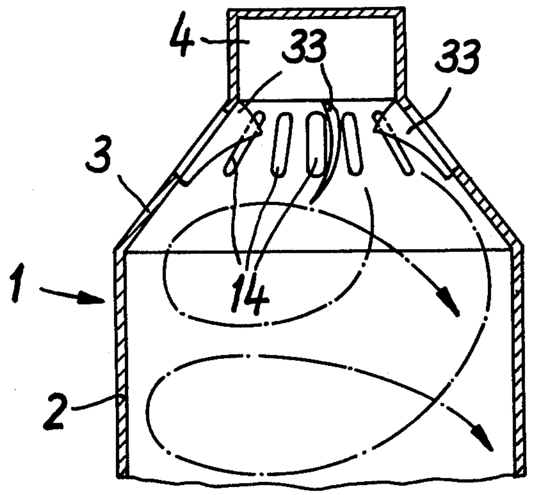

FIG. 7 illustrates a vertical axial section through a portion of a hood according to still another embodiment of the invention.

FIGS. 8 to 11 show details according to several alternatives.

The device according to the present invention for transloading pourable material by means of a grab bucket is characterized primarily in that a hood is so supported by a crane part on which a grab bucket is suspended by lifting means that said grab bucket can be pulled from below into said hood, said hood having such dimensions that the grab bucket can be opened within said hood. The rim of the hood which comprises the entrance opening for the grab bucket and the rim of an opening through which the pourable material is released by the grab bucket into a receiving chamber can be superimposed upon each other so as to at least approximately cover each other while between said two rims at a maximum there remains a narrow gap.

Referring now to the drawings in detail, with all embodiments, the hood 1 comprises a lower section 2 in the form of a straight circular cylinder, an upwardly adjacent truncated cone-shaped section 3, and a cylindrical cap 4 arranged on said truncated cone-shaped part 3. Hood 1 is suspended on the frame of a crane trolley 5 by means of short pull members 6. With the embodiment of FIG. 1, the frame of the trolley 5 supports two winches with drums 7 and 8 for closing and emptying the grab bucket. The pertaining cables are guided to the grab bucket 9 through an opening provided in an upper closure plate of the cap. The opening is closed by brushes 10.

Figure 1:
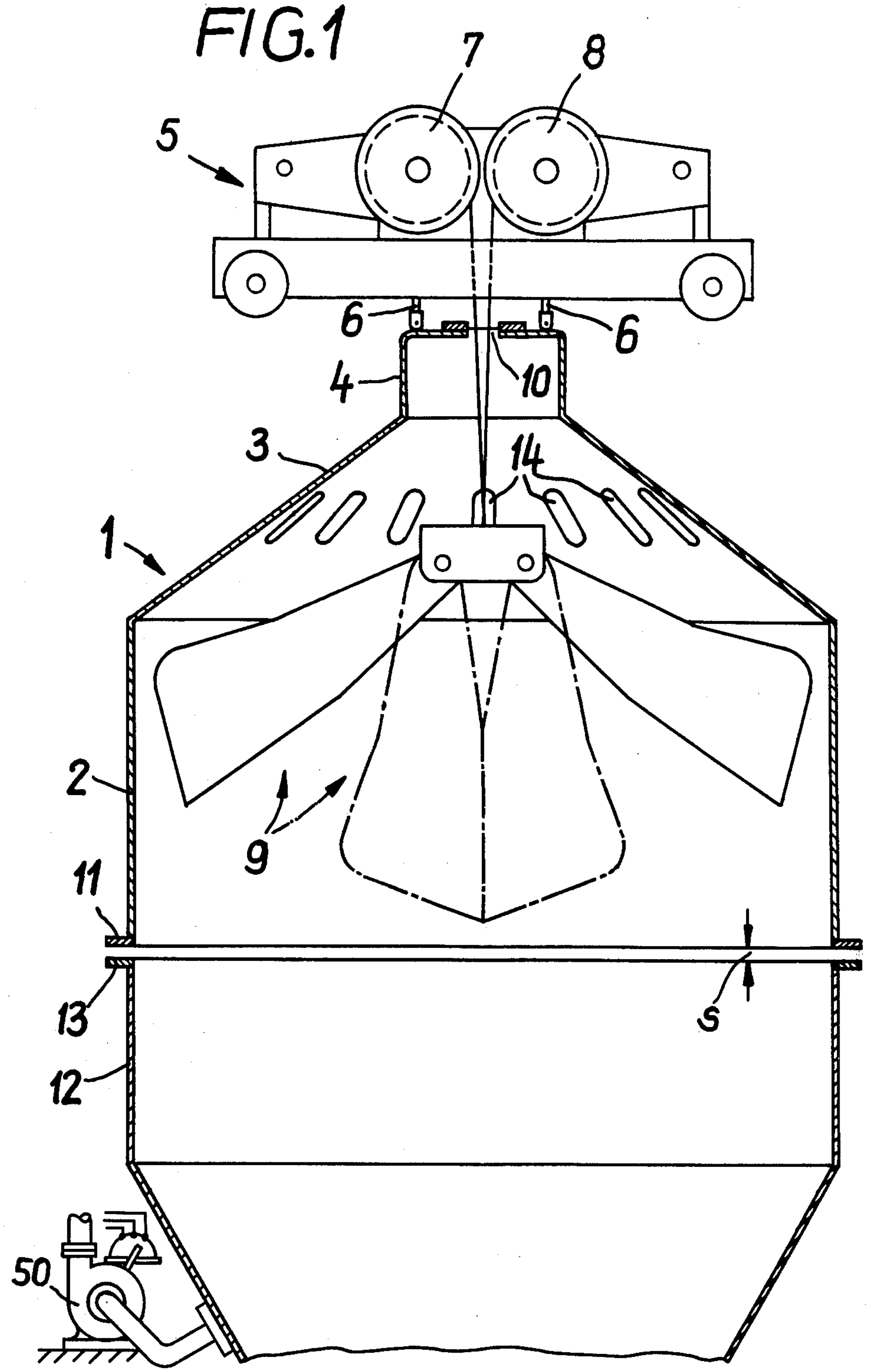
FIGS. 1, 2 and 3 illustrate partly in view, and partly in vertical section for three different embodiments a crane trolley and a hood suspended thereon as well as a bunker opening.

Hood 1 is so dimensioned that the grab bucket 9 can be opened from within the hood 1 as is illustrated in FIG. 1 by solid lines. The lower part 2 of the hood is open toward the bottom. Its lower rim is embraced from the outside by an annular flange 11.

Mounted on the bunker into which pourable material is to be introduced by means of the grab bucket 9 is a cylindrical loading chute 12, the inner diameter of which equals the inner diameter of the lower portion 2 of the hood. The upper rim of the loading chute 12 is on its outside embraced by an annular flange 13. The truncated cone-shaped section 3 of hood 1 has a plurality of slots 14 arranged along a circle.

When the grab bucket 9 is filled with pourable material, it is pulled from below into the hood while being in closed condition. Its position is indicated in FIG. 1 by dot-dash lines. Thereupon, the hood 1 is by means of trolley 5 moved into the position shown in FIG. 1 in which the lower part 2 is in alignment with the cylindrical chute 12. The dimensions are so selected that between the lower rim of hood 1 and the upper rim of the loading chute 12 there remains a relatively small gap *s* which may, for instance, have the width of a hand.

If now, the grab bucket 9 is moved into the discharging position indicated by the solid lines in FIG. 1, the pourable material drops out of the grab bucket through the loading chute 12 into the bunker. At the same time, air is withdrawn from said chute or said bunker whereby a ventilator 50 developing dust is removed. Due to the thus produced subatmospheric pressure of about 100 mm WS in the loading chute 12, air is from the outside drawn through the gap *s*. Consequently, no dust can escape toward the outside through the gap *s*.

Furthermore, air is, through slots 14, drawn into the hood 1 and moved downwardly into the loading chute 12. In this way, a very satisfactory rinsing of the hood 1 is realized.

Figure 2:
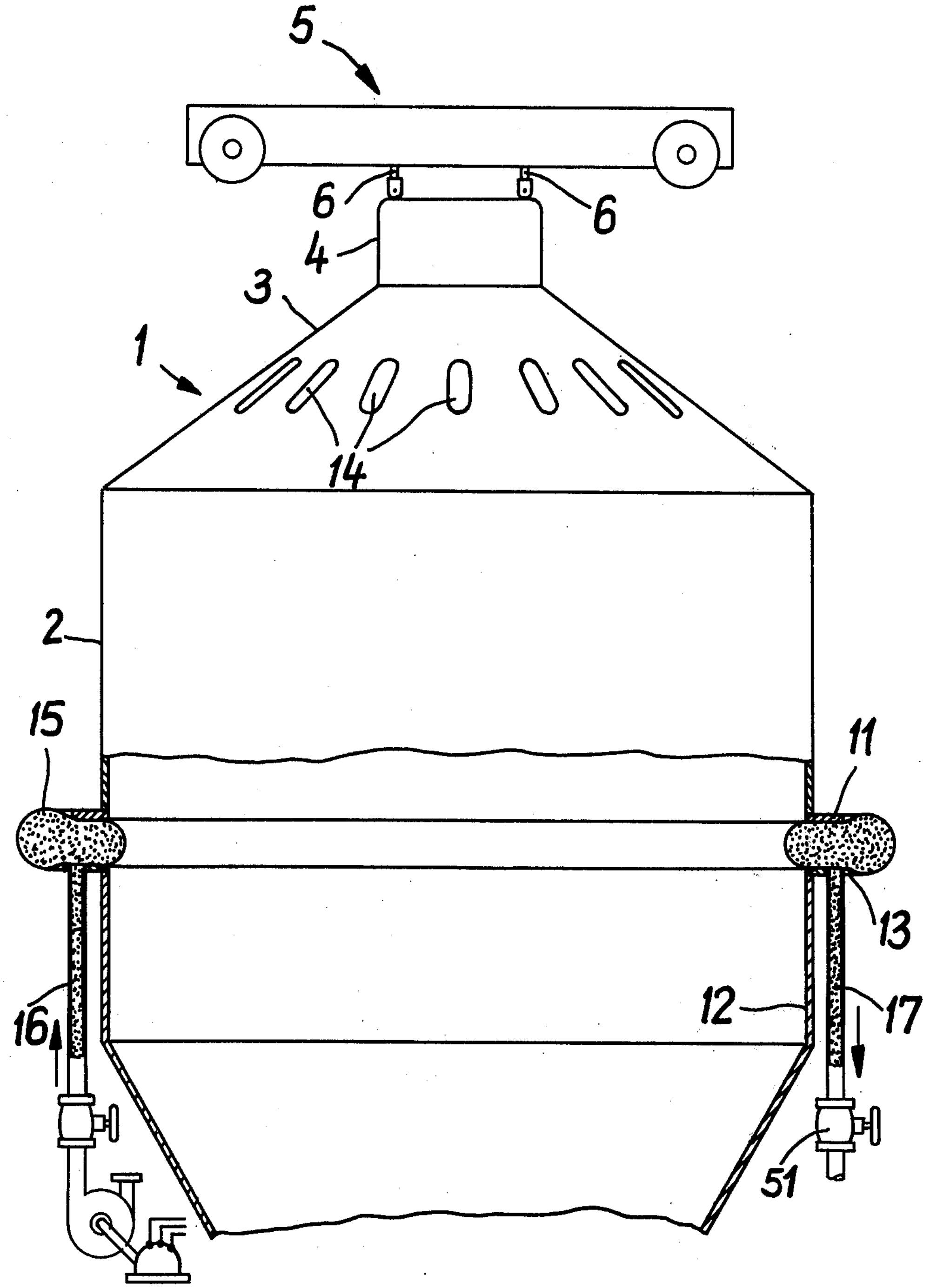

The drawing in of air through gap *s* requires a suction power which is to be put up with with small transloading devices. When, above all, with larger transloading installations an additional power supply for the drawing in of air through the gap *s* is economically not permissible, a seal for the gap may be provided. This may be effected, for instance, in conformity with FIG. 2 by means of an annular hose 15 which is arranged on the annular flange 13 of the loading chute. This annular hose 15 has a filling conduit 16 through which compressed air can be pressed into hose 15. The annular hose 15 comprises a filling conduit 16 through which compressed air can be pressed therethrough by a ventilator 50 and furthermore comprises a discharging conduit 17, said conduits being adapted alternately to be opened and closed by a valve 51 in any conventional manner. First the annular hose 15 is emptied so that the hood 1 can without being interfered with be moved into the position necessary for emptying the grab bucket. This movement is effected through the intervention of a charging chute 12. Thereupon, the annular hose 15 is by compressed air fed through the filling conduit 16 inflated in such a way as is evident from FIG. 2. In this connection, the gap between the two annular flanges 11 and 13 is filled in so that the hood 1 is sealed relative to the loading chute. After completion of the discharge, the air is withdrawn from the annular hose 15 through the emptying or discharging conduit 17 so that the annular hose collapses and frees the path for the removal of the hood.

Care has to be taken that the annular hose 15 when it is inflated for securing a seal between the hood 1 and the loading chute 12, will not lift the hood 1 and thereby the crane trolley 5 to such an extent that the wheels thereof derail. Therefore, expediently, rail hooks are provided on the head carriers of the trolley frame which rail hooks engage the heads of the trolley rails in such a way that they become effective only when the trolley is lifted by approximately the width of a thumb.

Figure 3:
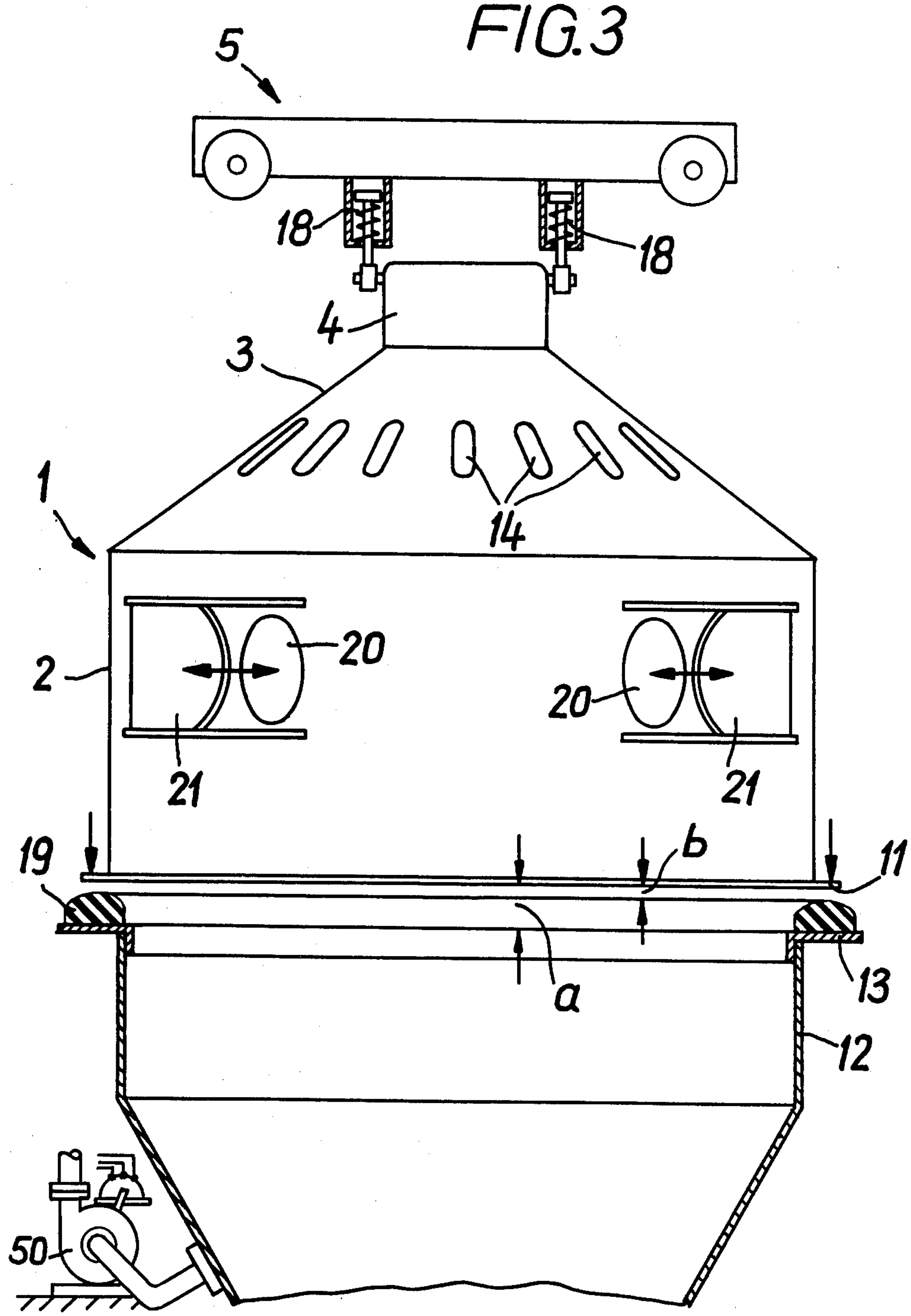

According to the showing of FIG. 3, the hood 1 is suspended on the frame of the trolley 5 by means of springs 18. When the hood 1 has been brought into the correct position above the loading chute 12 for the discharge of the grab bucket, the lower rim of said hood with the annular flange 11 has a considerably vertical distance *a* from the upper rim of the charging chute with the annular flange 13. Fixedly arranged on said annular flange 13 is a sealing ring 19 of an elastic material, for instance, of a polyurethane soft foam. This sealing ring 19 is slightly spaced from the annular flange 11 by a distance *b*.

The lower part 2 of the hood is provided with a plurality of relatively large openings 20 which can be closed by slides or valves 21.

When it is desired to unload the grab bucket arranged within the hood 1, a subatmospheric pressure of about 100 mm WS is generated by a ventilator 50 in the bunker and in the charging chute 12 while the large openings 20 are closed by the valves 21. Through the narrow slots 14, a pressure equalization cannot immediately occur. Consequently, the hood 1 is against the thrust of springs 18 pulled downwardly until the annular flange 11 is pressed against the sealing ring 19. In this way, the hood 1 is sealed relative to the charging chute 12. The dust formed during the emptying of the grab bucket, is withdrawn by the air flow which is generated by the drawing in of air through the slots 14. When the discharging operation has been completed and the dust-containing air has been withdrawn from the hood, the withdrawal is completed and the openings 20 are freed by the valves 21. Consequently, a pressure equalization occurs between the interior of hood 1 and the surrounding. Since, thus, the hood 1 is no longer subjected to a downwardly directed suction effect, the hood 1 will by springs 18 be lifted into the starting position according to FIG. 3. The hood 1 can then, together with the grab bucket, be moved away by the trolley 5.

In some circumstances, the sealing ring 19 will not be necessary, in which instance in the starting position of hood 1, only one relatively small gap prevails between the annular flanges 11 and 13. A hood suspended by means of springs may also in another manner than by means of a subatmospheric pressure prevailing in the charging chute be pulled downwardly against the thrust of the springs until it sits on a sealing ring or on the annular flange of the charging chute. For instance, this may be effected by means of mechanically or hydraulically operable driving mechanisms 52, see FIG. 8.

It is also possible for sealing the hood which floats at a narrow gap above the upper rim of the loading chute to provide relative thereto any suitable sealing means which are expanded in the direction of height by mechanical means. To this end, for instance, rim bellows 53 and piston slides may be considered. See FIGS. 9 and 10. Furthermore, a combination between such sealing means and sealing arrangements according to FIGS. 2 and 3 may be possible.

In order to make sure that the hood will not be damaged by the grab bucket when the latter carries out oscillations within said hood, the hood may be connected to the trolley by means yieldable in horizontal direction, said means preferably being damping means, for instance, a vibration damping connector 55 may be employed, see FIG. 11.

Figure 5:
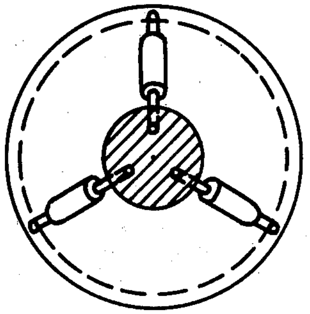
FIG. 5 represents a section taken along the line V—V of FIG. 4.

However, it is also possible that as indicated in FIGS. 4 and 5, the hood is suspended on the frame of the trolley by means of three or more hydraulic displacing devices. According to FIGS. 4 and 5, on one hand the piston rods 23 of three hydraulic displacing devices engage three one-point joints 23 at a holding means 24 on the bottom side of the frame of a trolley, whereas on the other hand the pertaining cylinders 25 are connected in one-point joints 26 on the top side of the cap 4 of a hood. The arrangement is such that the center lines of the three displacing devices 22, 25 form the edges of a truncated pyramid. The cylinders 25 are closed at the top and permit the piston rods 22 to pass through stuffing boxes.

FIG. 6 illustrates that the chambers of the cylinders 25 which are located above said pistons are interconnected by conduits in which there are provided throttle members 27. Also, the cylinder chambers below said pistons are through conduits connected to throttling members 27.

When the hood—for instance due to an open grab bucket carrying out a pendulum movement within the hood—receives horizontal shocks and swings out in any direction, liquid is conveyed to above and also to below the piston between the three cylinders while the throttle members 27 throttle the liquid flow communicating therewith. In this way, a damping of the oscillation movements of the hood will be realized.

FIG. 6 illustrates that by means of a pump 28 to the pressure line of which an air chamber 29 is connected, liquid can be pressed through a check valve 30 into the upper cylinder chambers. This is brought about when liquid from the upper cylinder chambers has passed into the lower cylinder chambers past the piston and consequently the hood has been lowered too far. To the extent to which liquid is pumped into the upper cylinder chamber, liquid can through check valve 31 flow out of the lower cylinder chambers. By means of the pump 28, it is thus possible to adjust the height of the hood with regard to the frame of the trolley and thereby also the gap, for instance *s*, in FIG. 1 can be predetermined which is to exist in the emptying position of the hood 1. This gap can be predetermined through the intervention of the charging chute between the annular flanges 11 and 13. Expediently, curved guiding plates are inserted into hood 1 which bring about that the air drawn in through the slots 14 will carry out downwardly progressing twisting movements. For instance, FIG. 7 shows guiding plates 33 which are curved in the manner of a shovel and are arranged adjacent and in part below said slots 14. In this way, it will be avoided that a distinct circular movement of the dust-containing air occurs on the inner side of the hood, whereby the dust in the air would be exposed to considerable centrifugal forces which could bring about a deposit of the dust along the inner side of the hood. The guiding plates 33 are expediently so designed and arranged that they impose upon the air a twisting movement which increases toward the center of the axis of the hood so that the twisting movement of the air on the inner side of the hood is relatively low. In order to bring about an as advantageous air flow as possible, the hood is expediently designed as body of rotation with a vertical axis as is the case with the illustrated embodiments. Generally there is the tendency to limit the dimensions of the hood to the extent that is necessary for receiving the opened grab bucket so that the air volume which is to be exchanged in the hood is at a minimum and consequently the rinsing can be completed in a relatively short time. Hood 1 may instead of being suspended on a crane trolley be also suspended, for instance, on a crane boom.

As will be evident from the above, the invention brings about the advance that expensive mounts for building emptying chambers on bunkers will no longer be necessary. Instead, the crane trolley, or a crane boom on which the grab bucket is suspended carries only a relatively light hood which is employed for charging a plurality of bunkers by means of one and the same crane, whereas with heretofore known arrangements, each bunker has to be equipped with a special discharging chamber. Furthermore, the present invention makes superfluous the difficult threading of the lifting cables supporting the grab bucket, in the slot provided in the roof of the chamber.

It is, of course, to be understood that the present invention is, by no means, limited to the specific showing in the drawings, but also comprises any modifications within the scope of the appended claims.

What I claim is:

1. In combination with a movable crane part and a grab bucket suspended thereon including actuating means for opening and closing said grab bucket, a device which includes: hood means, means mounting said hood means to said movable crane part, said hood means having an opening adjacent the bottom portion thereof so as to permit said grab bucket to be selectively moved into and out of said hood means, flange means surrounding said opening, the interior of said hood means being so dimensioned as to allow said grab bucket to completely open within said hood means, lifting and lowering means supported by said crane part and extending through and into said hood means and being securely connected to said grab bucket, said lifting and lowering means being operable to pull said grab bucket into its uppermost position within said hood means and to lower it out of said hood, material receiving means having at least an open top portion with flange means surrounding same, said movable crane part being operative to selectively place said hood means over said material receiving means with the respective one of said flange means being vertically and spacedly aligned to provide accurate transfer of material between said grab bucket and material receiving means.

2. The combination according to claim 1, which includes means for selectively withdrawing air from said hood means.

3. The combination according to claim 2, in which said hood means is provided with openings for drawing air from the outside of said hood means into the interior thereof.

* * * * *